US006968341B2

(12) United States Patent
Hand et al.

(10) Patent No.: US 6,968,341 B2
(45) Date of Patent: Nov. 22, 2005

(54) SYSTEM AND METHOD FOR POST-ANALYZING, AND SEQUENTIALLY VISUALIZING PLURALITY OF PREDEFINED METRICS IN A STORED DYNAMIC DATA VALUES ASSOCIATED IDENTIFIERS WITHIN DETERMINED TIME RANGE

(75) Inventors: Leonard S. Hand, Ft. Worth, TX (US); Jeffery R. Washburn, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/865,393

(22) Filed: May 25, 2001

(65) Prior Publication Data

US 2002/0177907 A1 Nov. 28, 2002

(51) Int. Cl.⁷ ................................................. G06F 17/30
(52) U.S. Cl. ............................. 707/102; 707/1; 707/10; 707/104.1; 345/440.1; 709/201; 714/47
(58) Field of Search .................... 707/1–10, 100–104.1, 707/200–205; 709/201–204, 215–225, 229–230; 345/440, 440.1, 440.2, 763–764, 738, 854, 804–809, 964–967; 714/47, 39; 715/501.1, 510–515; 382/141, 280; 725/88, 45, 52–53, 102

(56) References Cited

U.S. PATENT DOCUMENTS

| | | | | | |
|---|---|---|---|---|---|
| 5,428,776 A | * | 6/1995 | Rothfield | .......................... | 707/4 |
| 5,706,436 A | * | 1/1998 | Lewis et al. | ................. | 709/235 |
| 5,719,942 A | * | 2/1998 | Aldred et al. | ............... | 709/228 |
| 5,801,688 A | * | 9/1998 | Mead et al. | ................. | 345/700 |
| 6,021,215 A | * | 2/2000 | Kornblit et al. | ............. | 382/141 |
| 6,041,331 A | * | 3/2000 | Weiner et al. | ........... | 707/103 R |
| 6,046,742 A | * | 4/2000 | Chari | .......................... | 345/734 |
| 6,225,999 B1 | * | 5/2001 | Jain et al. | .................... | 715/734 |
| 6,282,547 B1 | * | 8/2001 | Hirsch | ......................... | 707/102 |

(Continued)

FOREIGN PATENT DOCUMENTS

CA 2287844 * 5/2001 ..................... 12/26

OTHER PUBLICATIONS

Kwan–Liu Ma et al. "strategies for visualizing time–varying volume data", CAD graphics 2001, Kunming international academic publishers, Aug. 22–24, 2001, 7 pages.*

(Continued)

*Primary Examiner*—Srirama Channavajjala
(74) *Attorney, Agent, or Firm*—Akerman Senterfitt (57) ABSTRACT

The present invention discloses a method and system for post-analyzing and sequentially viewing metrics for a stored dynamic heterogeneous data space. For example, performance data for a content delivery network can be post-analyzed. Realtime values for entities in the data space which are associated with the metrics can be received from an intelligent agent and sequentially stored in time within a datastore. The stored metrics can be subsequently retrieved from the database and played back for viewing on a graphical display. The playback of events stored by the metrics can occur as though the events were actually happening in real time. For sequential playback of the stored metric values, both a starting and an ending position can be determined. The data can be sequentially played back beginning at the starting position and terminating at the ending position. During playback, a list can be provided for selecting those metrics and entities of the data space that are to be displayed on the graphical display.

25 Claims, 4 Drawing Sheets

U.S. PATENT DOCUMENTS

| | | | | |
|---|---|---|---|---|
| 6,317,787 | B1 * | 11/2001 | Boyd et al. | 709/224 |
| 6,442,615 | B1 * | 8/2002 | Nordenstam et al. | 709/241 |
| 6,546,263 | B1 * | 4/2003 | Petty et al. | 455/566 |
| 6,622,171 | B2 * | 9/2003 | Gupta et al. | 709/231 |
| 6,651,048 | B1 * | 11/2003 | Agrawal et al. | 707/2 |
| 6,654,803 | B1 * | 11/2003 | Rochford et al. | 709/224 |
| 6,687,750 | B1 * | 2/2004 | Messinger et al. | 709/224 |
| 6,782,093 | B2 * | 8/2004 | Uckun | 379/266.06 |
| 6,792,468 | B1 * | 9/2004 | Bloch et al. | 709/231 |
| 2002/0054567 | A1 * | 5/2002 | Fan | 370/230 |
| 2002/0087679 | A1 * | 7/2002 | Pulley et al. | 709/224 |
| 2002/0143929 | A1 * | 10/2002 | Maltz et al. | 709/224 |
| 2004/0027349 | A1 * | 2/2004 | Landau et al. | 345/440 |
| 2004/0210625 | A1 * | 10/2004 | Bodin et al. | 709/201 |

OTHER PUBLICATIONS

Beverly L Harrison et al. "timelines: an interactive system for the collection and visualization of temporal data", appears in the proceedings of graphics interface, '94, 1994, 141–148, pp. 1–9.*

Traina,C.Jr. et al. "Fast indexing and visualization of metric data sets using slim–trees", Knowledges and data engineering, IEE transactions, vol. 14, issue: 2, Mar.–Apr. 2002, pp 244–260.*

Fredrik B et al. "Performance of Pastry in a Heterogeneous system", department of information technology, Upsala University, two pages.*

* cited by examiner

SYSTEM AND METHOD FOR POST-ANALYZING, AND SEQUENTIALLY VISUALIZING PLURALITY OF PREDEFINED METRICS IN A STORED DYNAMIC DATA VALUES ASSOCIATED IDENTIFIERS WITHIN DETERMINED TIME RANGE

BACKGROUND OF THE INVENTION

1. Technical Field

The present invention relates to the field of data monitoring and presentation, and more particularly, to a method and system for post-analyzing and sequential visualization of selectable metrics and components within a complex heterogenous system.

2. Description of the Related Art

Monitoring system performance can provide engineers and system operators with time critical information that can often help to alleviate or avert catastrophe and also design better systems. This is especially true for complex heterogeneous systems. Complex heterogenous systems are systems that can have entities and components that are diverse in their functionality and operability. In these complex heterogenous systems, it can often be necessary to monitor metrics defined for these systems in order to ensure that the components or entities in the system are functioning optimally. A metric is a standard of measurement that can be used for mathematical or statistical analysis. Metrics can include performance data or configuration information that can be used to setup software or hardware parameters. As the size of complex heterogeneous systems increase, so does the complexity of monitoring various metrics. Moreover, as complex heterogeneous systems become more diverse, it can become progressively more difficult to collect and analyze the various metrics collected.

Although realtime performance can be critical, post-performance monitoring can be equally important as real-time monitoring. In addition to recreating and analyzing catastrophic events, post-performance monitoring can be used as a training and engineering tool. In doing post-performance analysis, it is necessary to examine a sequence of past events as if those past events were occurring in real time. Since complex heterogeneous communication networks can consist of numerous entities and diverse components, the size and heterogeneous characteristics of these networks can make it extremely difficult to accurately sequence the events in order to effectively perform post time analysis.

Importantly, even after the performance metrics are collected for post-performance analysis, the collected data must be analyzed and presented in a manner that facilitates easy interpretation. Given the heterogeneous nature of these systems, post-performance monitoring must provide a flexible interface that gives choices amongst the various components, entities, elements and metrics that are to be analyzed. For example, in heterogeneous networks, all the performance metrics available during realtime performance must be readily available during a post analysis session in order to determine which metrics of a component are causing a bottleneck and what alternate components, entities or subsystems might have had resources available to accommodate additional traffic.

Notably, although data may be collected, the amount of data to be analyzed can often overwhelm any system or its operator. Hence there is a need for providing an option that can selectively determine which entities, components and metrics should be tracked during post-performance monitoring.

SUMMARY OF THE INVENTION

The invention discloses a method and apparatus for post-analyzing and sequentially visualizing a plurality of predefined metrics in a stored dynamic data space. The method includes storing in a datastore such as a database, values corresponding to the predefined metrics received from an agent, wherein each of the values can represent a characteristic of one of a plurality of entities in the data space. The stored values can be retrieved from the datastore and certain selected predefined metrics can be sequentially viewed on a graphical display. Storing values in the datastore can include saving values for the predefined metrics sequentially in time as the values are collected.

Retrieving the stored values from the datastore can include accessing the values in the datastore, determining a starting position and an ending position of the stored values that are to be retrieved and acquiring the sequentially stored values from the starting position to the ending position. Displaying the retrieved values can include selecting at least one of the metrics corresponding to an entity for display on the graphical display. The retrieved values for selected metrics can be displayed, with the display sequentially changing according to changes in the acquired values caused by changes in the stored dynamic data space. The sequentially changing graphical display can be controlled by selecting a playback function which can include playing, forwarding, fast forwarding, rewinding, fast rewinding, pausing and stopping.

In a further aspect of the invention, a method for post-analyzing and visualizing predefined metrics for at least one of a plurality of components in a heterogeneous communications network is disclosed. The method can include storing in a datastore, values for the predefined metrics received from an agent, with each of the values representing a characteristic of each component in the heterogeneous communication network. Stored values in the datastore can be retrieved and displayed on a graphical display. The graphical display can display certain selected ones of the predefined metrics for sequential playback. The storing step can include saving the values sequentially in time as they are collected.

The retrieving of the stored values can include accessing the stored values in the datastore, determining a starting position and an ending position for the stored values and acquiring the sequentially stored values from the starting position to the ending position.

Displaying the retrieved values can include selecting at least one of the metrics for display for certain selected ones of the components. A graphical display is provided for displaying the selected metrics, with the display sequentially changing according to changes in the acquired values caused by changes in the stored dynamic data space. The sequentially changing graphical display can be controlled by selecting a playback function which can include playing, forwarding, fast forwarding, rewinding, fast rewinding, pausing, stepping and stopping.

In another aspect of the invention, a system for post-analyzing and visualizing predefined data metrics for at least one of a plurality of communication components in a heterogeneous communications network is disclosed. The system can include a datastore for storing values received from an agent for the predefined metrics for each of the plurality of communication components and a computing device for retrieving the stored values from the datastore. A graphical display be used for sequentially playing back and viewing the retrieved values for selected ones of the predefined metrics on a graphical display. The values are stored in the datastore as the values are collected.

The computing device can include one or more processors that can be used for accessing stored values in the datastore, determining a starting position and an ending position of the stored values to be retrieved and for acquiring the sequentially stored values from the starting position to the ending position.

The display can include a graphical user interface for selecting the metrics for displaying certain selected components and a graphical display for displaying selected metrics, wherein the display sequentially changes according to changes in the acquired values caused by changes in the stored dynamic data space.

The system can also include a user interface for controlling the sequentially changing graphical display. The graphical user interface can contain buttons which can control playback functions. Playback functions can include playing, forwarding, fast forwarding, rewinding, fast rewinding, pausing and stopping function.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention discloses a method and system for post-analyzing and sequentially viewing performance metrics that have been previously stored. The stored performance metrics can be for a heterogeneous data space. Metrics are standards of measurements that can be used for mathematical or statistical data analysis. Realtime values for components and entities making up the data space and which correspond with the metrics can be sequentially stored in time within a datastore for example, a database. The values can be received from an agent, which can be a application or part thereof, designed specifically to collect and report information. The stored metrics can be subsequently retrieved from the database and played back for viewing on a graphical display. The playback of events stored by the metrics can occur as though the events were actually happening in real time. For sequential playback of the stored metric values, both a starting and an ending position can be determined. The data can be sequentially played back beginning at the starting position and terminating at the ending position. During playback, a list can be provided for selecting those metrics and entities of the data space that are to be displayed on a graphical display.

Heterogeneous systems are systems that contain numerous diverse components and entities that seamlessly interoperate to provide one or more functions. Heterogeneous systems can include, but are not limited to, computer networks, operating systems, databases and communications systems. Attributes of the metrics can be defined for the various components or entities within the system. Within a heterogeneous system, attributes of the metrics can be defined for the various components or entities within the system. An attribute is merely a type of metric used to identify a particular character of a system. The values associated with the defined attributes of the data metrics can be periodically collected from the entities within the system by using agents. These values associated with the defined attributes for the data metrics can be mapped to symbolic representations. Based on periodic updates of these values, symbolic representations of the updated values can be displayed in realtime in order to visualize the realtime operation of the components or entities forming the system. In addition to displaying the values for the data metrics associated with entities for components of the heterogeneous system, the values can be stored sequentially in time in an electronic storage such a database. A player can be used to subsequently retrieve the stored metrics from the storage and display the information on a data map as though the playback were occurring as it did previously.

Before storing the data in a database, the data must first be collected. An agent can be used to collect the data. An agent can be an application or part thereof, that can be designed specifically to interface with, and collect and report information on a device that is being managed. Agents, also referred in the art as "bots" (robot), can be used to collect metric values. With existing systems, the identity of each agent must be known to the map display and hence, its corresponding nodes. As a result, a specific protocol is required for communication between the agents and the display map. The present invention eliminates the need for a display to know the agent and hence, the need for a mandated protocol to facilitate communication between an agent and a display map. This can be accomplished by the agent initiating a request to the display map to acquire the identity of the nodes in the display map. Once the identity of the nodes are known to the agents, the agents can interrogate the components or entities in the network, and can collect updated values for the state of the components or entities which can be used to update the display map.

Notably, the map display can have indicators which can represent the realtime values of the system performance metrics. The indicators can include, for example, icons. Also, the performance data metrics which are displayed in the map can be selected from a list of data metrics. In this way, one viewing the map can easily recognize the realtime values for the metrics associated with particular components of the system being monitored.

Figure 1:
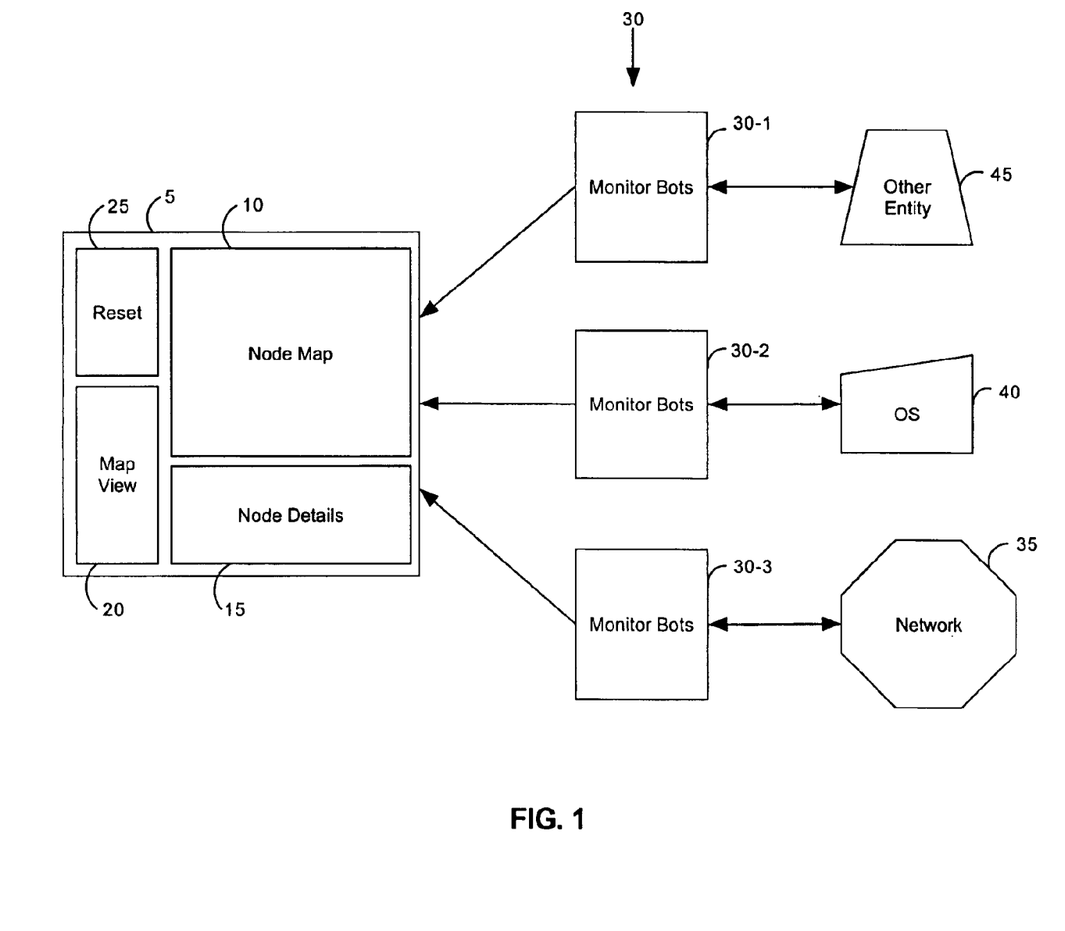
FIG. 1 is a block diagram of an exemplary system architecture which can be used for realtime and post-performance monitoring and analysis of data metrics for a heterogeneous system.

FIG. 1 is a block diagram which illustrates an exemplary architecture for a data metrics map in accordance with the inventive arrangements. Two components of the architecture of FIG. 1 include the data metrics map display 5 and the supporting data metrics map components. The data metrics map display 5 can contain a node map display section 10, a node detail display section 15, a map view display section 20 and a reset display section 25. The data metrics map components can include agents or monitor bots (robots) 30-1, 30-2 and 30-3. Other components of the architecture can include the system to be monitored, which can be a network component 35, an operating system component 40 and a miscellaneous component 45, for example, a network, a database, an operating system and/or an application, respectively.

The data metrics map display 5 can be a graphical display window in a CRT, LCD, Plasma or LED screen which can be coupled to a computing device such as a workstation, a PC, a laptop. The map display 5 can be a GUI, for example, a Java based browser configured to process HTML, XML, WML, or data formatted using another suitable markup language. The data metrics map display 5 can be divided into a plurality of display window sections, each display section serving a specific function. The node map section 10, the node detail section 15, the map view section 20 and the reset section 25 all can be windows located within the map display 5.

The database 60 can be a system having an electronic, optical or magnetic media for storing and retrieving information. Databases for storing information are known in the art. Playback analyzer 50 can be an application program running on a computing platform that can facilitate access to the database 60. The configuration file 65 can be a file accessible by the playback analyzer 50, which can store setup and control information necessary for configuring the playback analyzer. The filter can be a software application that can control the flow of data between the database 60, the playback analyzer 50 and ultimately, the map display 5. Although shown as separate entities, the playback analyzer 50, configuration file 65, filter 55 and database 60, can all reside on the same computer platform. Further, the aforementioned entities can be included within a single, more complex computer program.

A heterogeneous system to be monitored and for which data can be replayed, can include a network 35 consisting of workstations and other network entities, for example, routers, databases, switches, bridges, and web application servers (WAS). The system for which metric values can be visualized can include an operating system 40 and applications which can utilize the operating system. The operating system can be any operating system used on any type of computing platform as are well known in the art. A network management protocol can be used for communication between the various components and entities forming the system. Network management protocols are known in the art and can be used for monitoring and maintenance of these communications systems. The system to be monitored and for which data can be visualized can include other components such as entity 45, which can include databases, operating systems, and networks of communication devices.

In operation, the data metrics map display 5 can display a graphical representation of reported metrics from the components and entities within the system to be monitored. The map display 5 can dynamically change to reflect updated values for the reported metrics corresponding to the components and entities within the system being monitored. The graphical representation of the system components or entities can be displayed as icons or other suitable designators within the window of the node map section 10. In a further aspect of the invention, the graphical representation of the system components or entities displayed in node map section 10 can be connected by lines or placed in such a manner as to illustrate the relative communication relationships between the system being monitored and its components.

The node details display section 15 can display data metric values and other information pertaining to each component or entity in the heterogeneous system being monitored. The metrics collected for each of the components can be displayed, for example, in a chart, graph, or a table.

By comparison, the map view display section 20 can be used to control metrics to be reported, collected and displayed in the data metrics map display 5. The map view display section 20 can provide a list of the metrics to be selectively monitored and displayed. More particularly, only those metrics which are selected in the list are displayed in the node details display section 15. In addition, the corresponding icons in the map display section 10 can be updated to indicate the updated value of the selected metrics.

Additionally, the reset display section 25 can contain a selectable list of all the system components and entities. The selectable list of all the system components and entities can be used to reset all or particular ones of the metrics in the node details display section 15 and the node map section 10. The reset function allows the metrics to be initialized or set to a default value.

In one aspect of the present invention, a maximum and a minimum value can be defined for each metric to be monitored and displayed. Various levels of quantized values can be defined for values falling between the defined maximum and the defined minimum value. Each of the quantized values can be mapped or assigned to a unique indicator. Notably, the unique indicator can be a color, varying shades of gray, a pattern, or any combination thereof. A pattern, for example, can include variations of cross-hatched patterns. The unique indicator can be used in conjunction with the icon that represents an entity to represent the value of the metric for a particular entity. The unique indicator can be represented in the map view display section 20 where it can be used as a legend to reference the values indicated by the icons displayed in the map display section 10.

During a reporting phase, the data metrics map display 5 can receive updates of values pertaining to a particular metric from agents or bots 30-1, 30-2, 30-3, that monitor the components or entities 35, 40, 45 within the heterogeneous system. The updates of values pertaining to each metric can be the result of an interrogation from the bots 30-1, 30-2, 30-3 and can be contained within particular fields of an update message. In response to the interrogation from the agent or bots 30-1, 30-2, 30-3, the value of the requested metric can be sent to the agent or bot 30-1, 30-2, 30-3. This value of the metric can be used to update the data metrics map display 5. For example, bot 30-3 can interrogate a component of network 35 for a specific metric. In response to the interrogation request, the component of network 35 can supply the value of the requested metric to bot 30-3. The data metrics map can then be updated with the value through the reporting procedure.

Figure 3:
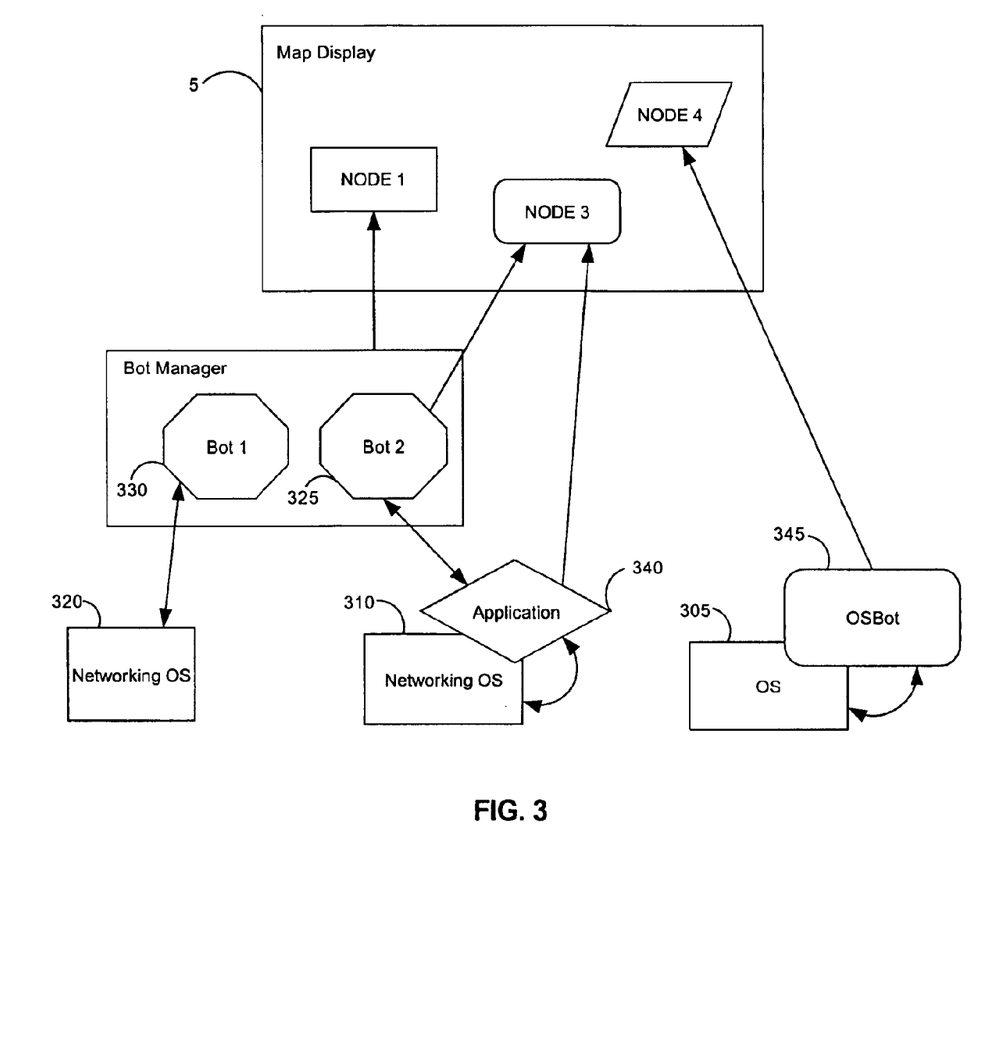
FIG. 3 is a diagram of an exemplary update process for a Data Metric Map which can be used to monitor a heterogeneous system.

In a further aspect of the invention, the bots 30-1, 30-2, 30-3 can be managed by a single bot manager (shown in FIG. 3). For example, bots 30-1, 30-2 and 30-3 can be managed as a single entity. Hence, the bot manager can handle interrogation of the component or entities of the system and also update the values of the data metrics map based on the response of the interrogation.

Figure 2:
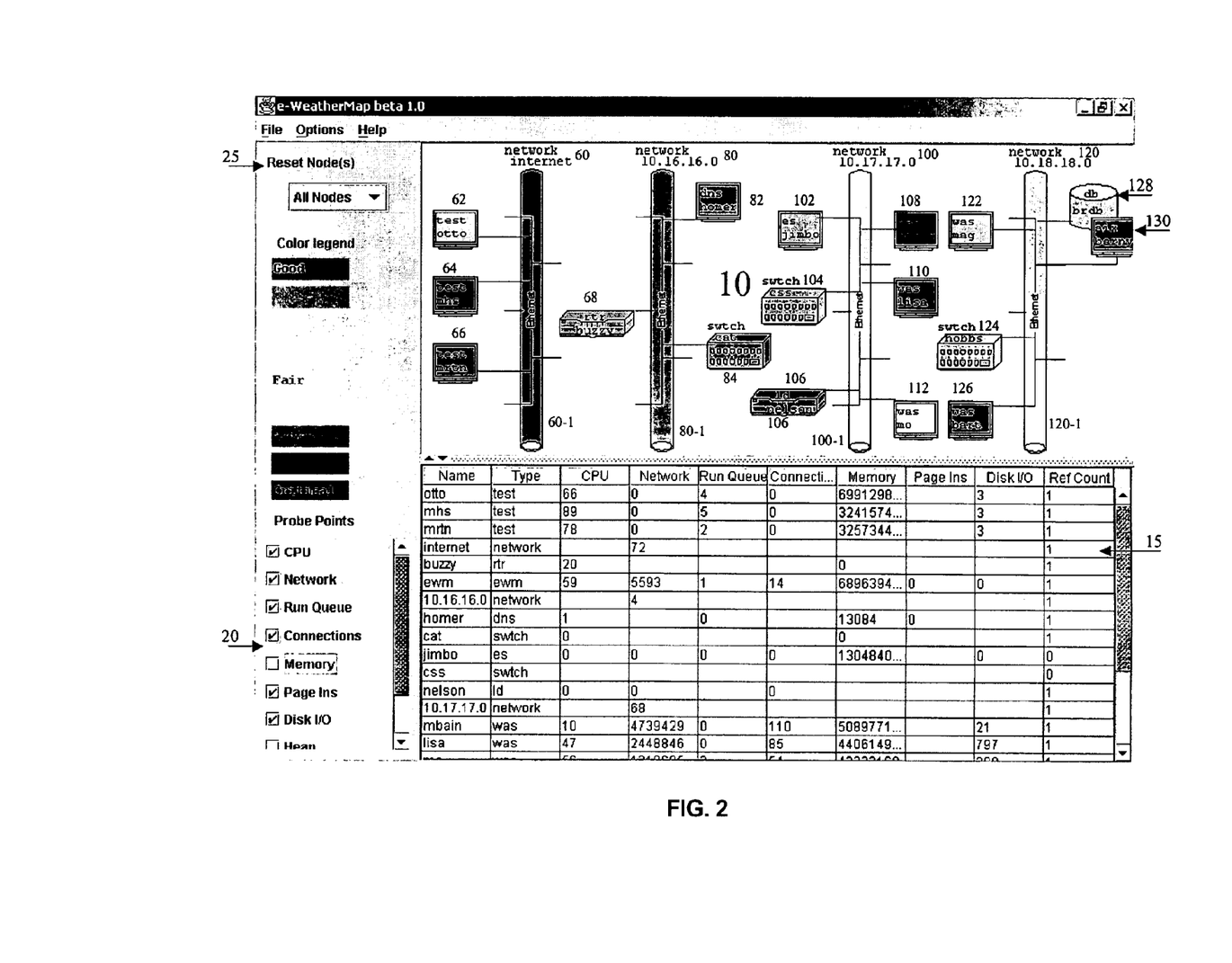
FIG. 2 is a detailed diagram of an exemplary Data Metric Map Display which can be used to monitor a complex heterogeneous system.

There is shown in FIG. 2, a detailed diagram of a data metrics map display used to monitor a heterogeneous communications network. The data metrics map of FIG. 2 can be used to dynamically monitor the network components or entities of four networks, 60, 80, 100, and 120. Network 60, the Internet, can include three components or entities, namely, a work station "otto" 62, a work station "mhs" 64, a work station "mrtn" 66. Network 80, having an IP address of 10.16.16.0, can have 3 components or entities. Namely, a domain name server (DNS) "homer" 82, a switch (swtch) "cat" 84, and a router component (rtr) "buzzy" 68. Network 100, having an IP address of 10.17.17.0, can include 6 components or entities. Namely, an edge server "jimbo" 102, a switch (swtch) "css" 104, a local director (Id) "nelson" 106, a web application server (WAS) "mbain" 108, a web application server (WAS) "lisa" 110, and a web application server (WAS) "mo" 112. Network 120, having an IP address of 10.18.18.0, can include 4 components or entities. Namely, a web application server (WAS) "mag" 122, a (swtch) "hobbs" 124, a web application server (WAS) "bart" 126, an AIX machine "barny" 130 and an database server "brdb" 128.

The graphical representation of the system components and entities to be displayed in the map display section 10 of the data metrics map can be icons. In one embodiment, a vertical cylindrical icon can be used to represent the backbone of the network. For example, the backbone of network 60 can be represented by a vertical cylindrical icon 60-1. The backbone of network 80 can be represented by a vertical cylindrical icon 80-1. The backbone of network 100 can be represented by a vertical cylindrical icon 100-1. The backbone of network 120 can be represented by a vertical cylindrical icon 120-1. An icon illustrating a monitor can used to represent workstations within the communication system being monitored. For example, workstations 62, 64, 66, 82, 108, 110, 112, 122, 126, and 130 can be represented by a monitor icon. The workstation can be a PC, a laptop, a conventional diskless workstation or a conventional workstation having a disk. An icon of a router can be used to represent components or entities that can function as routers in the system. For example, router 68 and local director 106 have similar icons. An icon of a switch can be used to represent switches in the system. For example, switches 84, 104, and 124 can be represented by the switch icon. The domain name server 82, edge server 102, and the web application servers 108, 110, 112 and 122 can be represented with a similar icon as a workstation. A conventional database icon can be used to represent database 128.

The node map section 10 can show the inter-relation between the various system components. For example, the components of network 80 can be shown to be associated to network 80 by connecting the router 68 icon, the domain name server 82 icon and the switch 84 icon by lines to the central backbone 80-1 icon.

The node detail display section 15 can display the name of the components or entities to be monitored and the value for the metrics. Referring to FIG. 2, the node detail display section 15 can be arranged in a tabular form. The name of the components or entities to be monitored can be located in the first column of the table. For example, the first entry, row one column 1, can contain the header "Name." The second entry, row 1 column 2, can contain the header "Type," which lists the type of component or entity. The components or entities along with their type can be listed respectively as shown: "otto" with a type of test, "mhsm" with a type of test, "mrtn" with a type of test, "Internet" with a type of network, "buzzy" with a type of router (rtr), "ewm" with a type of "ewm", 10.16.16.0 with a type of network, "homer" with a type of domain name server (DNS), "cat" with a type of switch (swtch), "jimbo" with a type of es, "css" with a type of switch (swtch), "nelson" with a type of local director, 10.17.17.0 with a type of network, "mbain" with a type of web application server (was), and "lisa" with a type of web application server (was).

The name of the metrics to be monitored for the components or entities can be placed in the first row of the table in the node detail section 15, starting at the third column. The names can be used as headers for each column. For example, the metrics to be monitored for each component or entity of the system can include, CPU usage (CPU), Network Usage (Network), Run Queue, Connections, Memory, Page Ins, and Disk I/O respectively. The corresponding value of a metric for a specific component or entity can be located at the position where the metric column intersects the entity or component row.

The map view display section 20 can contain a list of probe points, for example, as shown under the heading Probe Points in FIG. 2. The probe points are the metrics that can be measured for the components or entities forming the system. Referring to FIG. 2, the list of probe points or metrics to be monitored can include: CPU usage (CPU), Network Usage (Network), Run Queue, Memory, Connections, Page Ins, and Disk I/O. In one aspect of the invention, the probe points or metrics are selectable. The selection of a probe point or metric can occur by placing a check mark next to the probe point or metric. The selection of the probe point or metric can determine which metric is displayed in the map display section 10 of the data metrics map. The inclusion of seven selectable probe points can provide a possible 128 or $2^n$ views for metrics of the components or entities forming the system.

As the updates containing the metric values for monitored components and entities are received, the corresponding locations in the table of the node detail section 15 can be dynamically updated. The update process can occur in realtime or it can be delayed. The node map display section 10 can also be updated whenever updated values for the entities are received. Based on which probe points or metrics are selected in the map view display section 20, the appropriate icons representing the component or entity will be updated to reflect the updated value for the metric. As an illustrative example, the updated value for the CPU usage of WAS "mo" 112 is 7%. The attributes for the CPU usage can be defined as follows. The maximum CPU usage for the system can be 100% and the minimum can be 1%. The CPU usage can be quantized into discrete values and each discrete value represented by a different color as follows: 1%–10%:DARK GREEN, 11%–20%:ORANGE, 21%–30%:YELLOW, 31%–40%:BLUE, 41%–50%:INDIGO, 51%–60%:VIOLET, 61%–70%:TEAL, 71%–80%: LIGHT GREEN, and 80%–100%:RED. The 80–100% range indicated in red can signify a critical state. The 41%–50% range represented in indigo, can represent a fair state. The 11%–20% range indicated in orange, can represent an good state. The 1%–10% range indicated in dark green, can represent an excellent state. Varying operating states can exist between these states. Since the updated value of the CPU usage for "mo" was 7%, then the icon for 112 would be represented in the color dark green indicating that an excellent state exists for "mo." If the updated memory usage value for "mo" was 95%, leaving insufficient memory for the CPU to operate, and memory was also selected in the map view display section 20, the icon 112 for "mo" can be changed to reflect the new value and critical range for memory usage in the node map display section 10.

It should be appreciated that a method for accurately indicating multiple metrics values for many different selected metrics can be implemented. In one aspect of the invention, the metrics can be prioritized for display. As a result of this priority scheme, only the metric with the highest priority gets selected for display on the map. Hence, if CPU was given a higher priority than the memory usage, the icon displayed in the node map section 10 for 'mo' can be dark green indicating that the CPU usage was within an excellent state. Still, metrics can be displayed on a rotating basis, one after another, and each for a limited time. However, all selected metric values can be displayed in the table of the node detail section 15 of the map. In a further aspect of the invention, critical values that are displayed in the table of the node map section 10 can be colored and or made to flash.

In a further aspect of the invention, whenever there are more than one critical states for an entity or component, the icon for that component or entity can be made to flash within the node map window 10 and/or the node detail window 15. During operation, a user can notice the flashing critical state and can then consult the node detail section 15 to determine the actual metrics that are causing the critical condition. Additionally, a user viewing the map display section 10 can uncheck the checked selection in the map view display section 20, and reselect those probe points or metrics which were previously checked one at a time. This can instantly show each of the metrics causing the critical states as that metric is selected.

In accordance with the inventive arrangements, the agents or bots can be used to acquire values for the metrics and update the data metrics map accordingly. FIG. 3, is a block diagram illustrating three components of a network, namely, an OS component 305, a networking OS component 310 and a networking OS component 320. The OS component 305 can contain an operating system bot 345 (OSBot) that can reside within an OS component 305. The OSBot 345 can interrogate the component directly and update the data metrics map metrics values for the OS component 305.

In operation, networking OS Component 320 can be interrogated in order to acquire values for specified data metrics through bot 1 (330). In response to this interrogation request, the networking OS component 320 can send the value for the requested data metrics to bot 1 (330), an identity of the component, and a record of the time at which the data was collected or sent. On receipt of the updated value for the data metric, the bot 1 (330) can update the appropriate node, node 1, of the data metrics map with the updated value for the data metrics. Additionally, the updated values for each metric associated with the nodes or entities forming the system can be stored in the database 60.

The networking OS component 310 can contain an application, for example, application 340. Application 340 can be integrated within the networking OS component 310 or it can reside externally to the networking OS component 310. In one aspect of the invention, the application 340 can interrogate networking OS component 310. Upon interrogation of the network OS component 310, application 340 can update node 3 of the map display 5. Moreover, bot 2 (325) can independently interrogate the networking OS component 310 for updated values for specified data metrics. Upon receipt of these updated value, bot 2 (325) can also update node 3 of the display map 5. It should be readily understood that although a bot, such as bot 2 (325), can interrogate a component or entity, a bot can otherwise influence a component or entity, for example by accessing that component or entity. The bot can acquire any updated data metrics and accordingly update a node.

The OS component 305 can contain an OSBot 345. The OSBot 345 can be integrated within the OS component 305 or it can reside externally. In operation, OSBot 325 can interrogate the OS component 305 for updated values for specified data metrics. On receipt of the updated values, the OSBot 345 can directly update the appropriate node, node 4, of the map display. Additionally, the updated values for the metrics associated with the nodes or entities within the system can be stored in the database 60.

Storing the updated values can include storage of the actual updated value, an identity of the component or entity, and an identifier used to record the time at which the data was measured. The identity of the component or entity can be its network name, its IP address or its medium access control (MAC) address. The identifier used to record the time at which the data was measured can be a time stamp, or it can be a sequence number. It should readily be understood that the identifiers are randomly chosen and are not intended to be a limitation on the system.

The manner in which the stored information gets saved can be dependent on the medium in which it gets stored. For example, if a magnetic tape is utilized to store the information in database 60, then the information can be stored sequentially on the tape. If however, a hard disk is utilized to store the information in database 60, then the data can be stored sequentially or randomly. In accordance with the invention, data can be stored sequentially or randomly in the database 60, since the data is sequenced with respect to time on retrieval for display.

Stored data in the database 60 can be subsequently retrieved whenever there is a need for post-performance analysis. The post-performance analysis can include retrieving the stored information from the database 60 and playing back the information for display within the map view or display 5, under the control of the playback analyzer 50. The playback analyzer can read the configuration file 65 in order to determine what information will be used to create the post-performance monitoring session.

For example, the configuration file 65 can define a starting and an ending position for which data should be extracted for the session. The configuration file 65 can also control the type of information that gets displayed in the node display section 10 and the node detail section 15. For example, the configuration file 65 can be used to determine which nodes or entities forming the heterogeneous system are to be monitored and displayed in the map display 5 during the post-performance monitoring session. In conjunction with the configuration file 65, the filter 55 can determine what information is sent to the playback analyzer 50 from the database 60.

Figure 4:
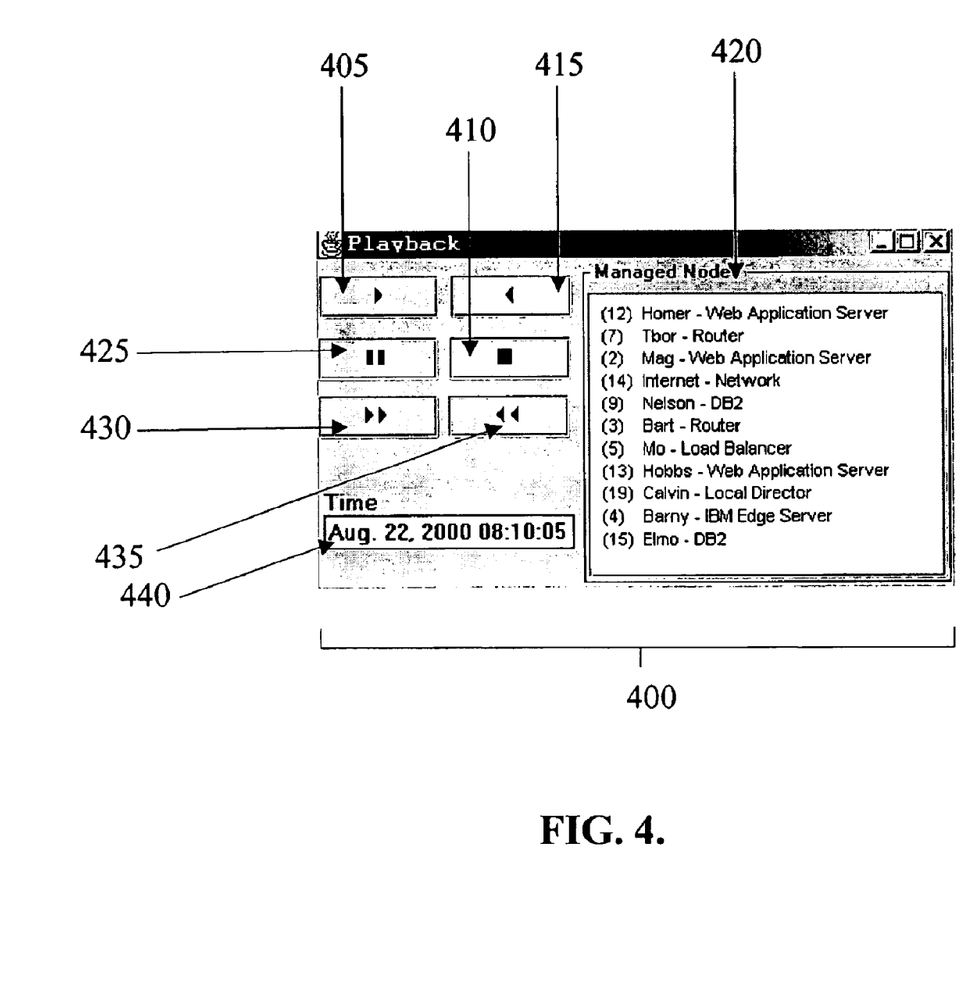
FIG. 4 is a diagram of an exemplary console for controlling playback features which can be used for post-performance monitoring and analysis.

Referring now to FIG. 4, there is shown an exemplary console 400 that can be used to control the playback of data. The console 400 can have control buttons 405, 410, 415, 425, 430 and 435, a managed node display window 420 and a time display window 440. These control buttons can control the retrieval and playback of the data stored in database 60. Button 405 can be a play button that can initiate playback in the forward direction. Button 405 can also provide a stepping function that permits a user to step through a sequence by, for example, holding down button 405. Button 415 can be a reverse playback button that can control playback by rewinding portions of the playback. Button 425 can be a pause button that can be used to momentarily halt the playback. Button 410 can be a stop button that can be used to stop the playback session. Button 430 can be a fast forward button that can control the speed of the playback making the playback faster in the playback direction. Button 435 can be a fast reverse button that can control the speed of the playback. The playback console can also have a managed node display window 420 which can show a list of the nodes being managed. The managed node display window 420 can be controlled by the configuration file 65. The configuration file can determine which nodes in the heterogeneous system are monitored and displayed in the node map window 5 during the post-performance monitoring session.

In operation the pause button differs in its function from the stop button in that the pause button halts playback and retains the instantaneous display of the map view or display, while the stop button can clear the display of any data. Hence, the pause button allows the instantaneous status of all the components or entities forming the system to be simultaneously viewed.

The playback console 400 can also have a time display window. The time display window 400 can show the actual time of occurrence of each of the events that are being played back. In a further aspect of the invention, the time display window can allow the input of a specific instance of time, the corresponding events for the time can be displayed on the screen. For example, the current time displayed in the time display window 440 is 08:10:05. To determine the condition that existed 10 minutes later, the time can be changed to 08:20:05.

While exemplary systems and methods embodying the present invention are shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

The present invention can be realized in hardware, software, or a combination of hardware and software. A method and system for replaying and visualizing post-performance metrics according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for post-analyzing and sequentially visualizing a plurality of predefined metrics in a stored dynamic data space, comprising:

storing in a datastore, values corresponding to predefined metrics received from an agent, each of said values representing a characteristic of one of a plurality of entities in a data space, wherein data for temporally coordinating interactions among the entities is also stored in the datastore, wherein said data for temporally coordinating interactions comprises for each of said values an identifier used to record a time at which the corresponding value was measured;

detecting an analysis event that indicates that a post-performance analysis is to be performed for a designated time;

determining a time range applicable for the designated time;

retrieving said stored values from said datastore that have associated identifiers specifying times within the determined time range; and displaying said retrieved values for selected ones of said predefined metrics for sequential viewing, on a graphical display, previously occurring network events involving the entities, wherein the displaying step utilizes previously stored temporal data to display interactions among at least a portion of the entities in a time sequenced manner.

2. The method according to claim 1, said determining step further comprising the steps of:

determining a starting time for the time range and an ending time for the time range.

3. The method according to claim 1, wherein an interface utilized by the displaying step to display the previously occurring network events is configured to display network events in real-time.

4. The method according to claim 1, further comprising controlling said sequentially changing graphical display by selecting a playback function from the group consisting of playing, forwarding, fast forwarding, rewinding, fast rewinding, pausing, stepping and stopping.

5. A method for post-analyzing and visualizing predefined metrics for at least one of a plurality of distributed components in a heterogeneous system, the method comprising:

at least one software agent retrieving and processing predefined metrics, each metric representing a characteristic of a component in a heterogeneous system, wherein each of said agents is configured to processes the received values in an entity-independent manner;

storing in a datastore, values for the processed metrics, each value being associated with an identifier used to record a time at which the corresponding value was measured which is also stored in said datastore;

identifying a previously occurring network event involving components associated with the at least one agent;

determining a time range applicable for the previously occurring network event;

retrieving said stored values from said datastore for the network event that have associated identifiers specifying times within the determined time range; and displaying said retrieved values for selected ones of said predefined metrics for sequential playback on a graphical display, wherein said sequential playback indicates previously occurring interactions among components in the heterogeneous system.

6. The method according to claim 5, wherein said storing step, comprises storing said values sequentially in time as said values are collected along with data for temporally coordinating interactions among the components.

7. The method according to claim 5, wherein said retrieving step, comprises:

accessing stored values in said datastore;

determining a starting time and an ending time for which said stored values are to be retrieved; and acquiring said sequentially stored values from said starting time to said ending time.

8. The method according to claim 5, wherein said step of displaying said retrieved values, comprises:
   selecting at least one of the metrics for display for selected ones of said components; and
   providing a graphical display of said selected metrics, said display sequentially changing according to changes in said acquired values caused by changes in the stored dynamic data space.

9. The method according to claim 5, further comprising controlling said sequentially changing graphical display by selecting a playback function from the group consisting of playing, forwarding, fast forwarding, rewinding, fast rewinding, pausing, stepping and stopping.

10. A system for post-analyzing and visualizing predefined data metrics for at least one of a plurality of communication components in a heterogeneous system, the system comprising:
   at least one agent configured to gather and process metrics from a plurality of communication components in a component-independent fashion;
   a datastore for storing values from agents, each stored value being associated with an identifier used to record a time at which the corresponding value was measured which is also stored in said datastore; and
   a graphical interface for sequentially playing back and viewing component interactions and related data provided by the agents, wherein the agents are configured to selectively utilize the datastore and the communication components as information sources, wherein when the datastore is utilized as an information source, previously occurring network events are presented in the graphical interface by selectively retrieving values from the datastore based upon how the indicators associated with the values compare to a time of the previously occurring network events.

11. The system according to claim 10, wherein said computing device, comprises:
   a processor for accessing stored values in said datastore;
   a processing means for determining a starting time and an ending time of said stored values to be retrieved; and
   a second processing means for acquiring said sequentially stored values that have associated identifiers specifying times between said starting time to said ending time.

12. The system according to claim 10, further comprising:
   means for selecting at least one of the metrics for display for selected ones of said communication component; and
   a graphical display for displaying said selected metrics, said display sequentially changing according to changes in said acquired values caused by changes in the stored dynamic data space.

13. The system according to claim 10, further comprising a user interface for controlling said sequentially changing graphical display by selecting a playback function from the group consisting of playing, forwarding, fast forwarding, rewinding, fast rewinding, pausing, stepping and stopping function.

14. The system according to claim 10, wherein when the communication components are utilized as information sources, network events are presented in the graphical interface in real-time.

15. The system according to claim 14, wherein said datastore, comprises a storage for storing said values, wherein said values are collected and presented in real-time upon the graphical interface in addition to being stored within said data store.

16. A machine readable storage having stored thereon, a computer program having a plurality of code sections for post-analyzing and sequentially visualizing a plurality of predefined metrics in a stored dynamic data space, said code sections executable by a machine for causing the machine to perform the steps of:
   storing in a datastore, values corresponding to predefined metrics received from an agent, each of said values representing a characteristic of one of a plurality of entities in a data space, wherein data for temporally coordinating interactions among the entities is also stored in the datastore, wherein said data for temporally coordinating interactions comprises for each of said values an identifier used to record a time at which the corresponding value was measured;
   detecting an analysis event that indicates that a post-performance analysis is to be performed for a designated time;
   determining a time range applicable for the designated time;
   retrieving said stored values front said datastore that have associated identifiers specifying times within the determined time range; and
   displaying said retrieved values for selected ones of said predefined metrics for sequential viewing, on a graphical display, previously occurring network events involving the entities, wherein the displaying step utilizes previously stored temporal data to display interactions among at least a portion of the entities in a time sequenced manner.

17. The machine readable storage according to claim 16, wherein said storing step, comprises storing said values for the predefined metrics sequentially in time as said values are collected.

18. The machine readable storage according to claim 16, said determining step further comprising the steps of:
   determining a starting time for the time range and an ending time for the time range.

19. The machine readable storage according to claim 16, wherein an interface utilized by the displaying step to display the previously occurring network events is configured to display network events in real-time.

20. The machine readable storage according to claim 16, further comprising controlling said sequentially changing graphical display by selecting a playback function from the group consisting of playing, forwarding, fast forwarding, rewinding, fast rewinding, pausing, stepping and stopping.

21. A machine readable storage having stored thereon, a computer program having a plurality of code sections for post-analyzing and visualizing predefined metrics for at least one of a plurality of distributed components in a heterogeneous system, said code sections executable by a machine for causing the machine to perform the steps of:
   at least one software agent retrieving and processing predefined metrics, each metric representing a characteristic of a component in a heterogeneous system, wherein each of said agents is configured to processes the received values in an entity-independent manner;
   storing in a datastore, values for the processed metrics, each value being associated with an identifier used to record a time at which the corresponding value was measured which is also stored in said datastore;
   identifying a previously occurring network event involving components associated with the at least one agent;
   determining a time range applicable for the previously occurring network event;

retrieving said stored values from said datastore for the network event that have associated identifiers specifying times within the determined time range; and displaying said retrieved values for selected ones of said predefined metrics for sequential playback on a graphical display, wherein said sequential playback indicates previously occurring interactions among components in the heterogeneous system.

22. The machine readable storage according to claim 21, wherein said storing step, comprises storing said values sequentially in time as said values are collected along with data for temporally coordinating interactions among the components.

23. The machine readable storage according to claim 21, wherein said retrieving step, comprises:

accessing stored values in said datastore;

determining a starting time and an ending time for which said stored values are to be retrieved; and acquiring said sequentially stored values from said starting time to said ending time.

24. The machine readable storage according to claim 21, wherein said step of displaying said retrieved values, comprises:

selecting at least one of the metrics for display for selected ones of said components; and providing a graphical display of said selected metrics, said display sequentially changing according to changes in said acquired values caused by changes in the stored dynamic data space.

25. The machine readable storage according to claim 21, further comprising controlling said sequentially changing graphical display by selecting a playback function from the group consisting of playing, forwarding, fast forwarding, rewinding, fast rewinding, pausing, stepping, and stopping.

* * * * *